(12) United States Patent
Morita et al.

(10) Patent No.: US 9,122,267 B2
(45) Date of Patent: Sep. 1, 2015

(54) INTERFERENCE CHECKING DEVICE AND NUMERICAL CONTROL APPARATUS

(71) Applicant: Mitsubishi Electronic Corporation, Chiyoda-ku, Tokyo (JP)

(72) Inventors: Toshiyuki Morita, Nagoya (JP); Nobuyuki Takahashi, Chiyoda-ku (JP); Tadahiro Otsuka, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 14/000,272

(22) PCT Filed: Feb. 21, 2013

(86) PCT No.: PCT/JP2013/054376
§ 371 (c)(1),
(2) Date: Aug. 19, 2013

(87) PCT Pub. No.: WO2014/128890
PCT Pub. Date: Aug. 28, 2014

(65) Prior Publication Data
US 2014/0233839 A1 Aug. 21, 2014

(51) Int. Cl.
G06T 7/00 (2006.01)
G05B 19/4061 (2006.01)
G06T 7/60 (2006.01)

(52) U.S. Cl.
CPC .......... *G05B 19/4061* (2013.01); *G06T 7/0067* (2013.01); *G06T 7/602* (2013.01); *G05B 2219/37559* (2013.01); *G06T 7/0004* (2013.01)

(58) Field of Classification Search
None
See application file for complete search history.

(56) References Cited

U.S. PATENT DOCUMENTS

| 5,295,075 A | * | 3/1994 | Korner et al. | 700/186 |
| 5,751,584 A | * | 5/1998 | Yuasa et al. | 700/178 |
| 2011/0257778 A1 | * | 10/2011 | Takahashi et al. | 700/104 |
| 2012/0016507 A1 | * | 1/2012 | Iriguchi et al. | 700/104 |

FOREIGN PATENT DOCUMENTS

| JP | 04-053508 U | 5/1992 |
| JP | 05-011823 A | 1/1993 |
| JP | 09-085584 A | 3/1997 |
| JP | 2000-322117 A | 11/2000 |
| JP | 2001-222304 A | 8/2001 |
| JP | 2006-277293 A | 10/2006 |
| JP | 2007-286688 A | 11/2007 |
| JP | 2008-210179 A | 9/2008 |

* cited by examiner

*Primary Examiner* — Jon Chang
(74) *Attorney, Agent, or Firm* — Sughrue Mion, PLLC; Richard C. Turner (57) ABSTRACT

An interference checking device includes a contour shape analyzing unit that extracts a contour shape of a tool cross section and a tool length by analyzing a two-dimensional image of a rotating tool, a rotation center analyzing unit that obtains a rotation center of the rotating tool by analyzing the contour shape, a three-dimensional-rotation-shape generating unit that generates a three-dimensional shape of the rotating tool on the basis of the contour shape, the tool length, and the rotation center, and an interference check processing unit that checks whether the rotating tool and a component other than the rotating tool interfere with each other when numerical control machining is performed on a workpiece by using the rotating tool, by using the three-dimensional shape, in which the three-dimensional-rotation-shape generating unit generates the three-dimensional shape by using a left-side contour shape.

6 Claims, 7 Drawing Sheets

INTERFERENCE CHECKING DEVICE AND NUMERICAL CONTROL APPARATUS

CROSS REFERENCE TO RELATED APPLICATIONS

This is a National Stage of International Application No. PCT/JP2013/054376, filed Feb. 21, 2013, the contents of all of which are incorporated herein by reference in their entirety.

FIELD

The present invention relates to an interference checking device that checks interference between a tool used in a machine tool and other components and a numerical control apparatus.

BACKGROUND

Numerical control (Numerical Control; hereinafter, referred to as NC) apparatuses are apparatuses that cause a machine tool to machine a material (workpiece) in accordance with a machining program. Before machining by a machine tool is started, it is necessary to check that the machine tool operates without collisions between various components being caused. Therefore, an interference check simulation is performed in advance. In this interference check simulation, checks are made as to whether any of the components constituting the machine tool, a tool used in the machine tool, the material, and a jig interfere with each other. In order to perform such an interference check simulation, three-dimensional shapes of the tool and the like are necessary.

A method of performing an interference check includes a method in which the three-dimensional shapes of the components constituting the machine tool, tool, material, and jig are approximated as plane data groups. In this method, each plane data group is arranged at a position on the machine tool that operates in accordance with a machining program and it is detected whether collisions occur by calculating intersection lines by using a computer.

The three-dimensional shapes of the components constituting the machine tool do not change for each machining program; however, the three-dimensional shapes of the tool, material, and jig change for each machining program. Therefore, if the three-dimensional shapes of the tool, material, and jig can be prepared quickly, many machining programs can be executed. Moreover, collisions between components can be detected more accurately if the expression capability of a three-dimensional shape is higher.

Methods of inputting a three-dimensional shape into an NC apparatus, for example, include the following three methods:

(Method 1) Method of inputting a three-dimensional shape generated by three-dimensional CAD (Computer Aided Design).

(Method 2) Method of setting, as a three-dimensional shape, a shape that is generated by rotating a contour shape, which is obtained when a rotating body is projected onto the plane that passes through the rotation axis of the three-dimensional shape, about the center line of the contour shape.

(Method 3) Method of preparing a template that has dimension lines obtained by replacing dimension values expressing a shape by parameters and parametrically inputting a three-dimensional shape by inputting the parameters.

In the case of the method 1, it is necessary to prepare a PC and three-dimensional CAD software in addition to the NC apparatus; therefore, investment in equipment is required. Moreover, the NC apparatus in this case cannot change the input three-dimensional shapes.

In the case of the method 2, because a linear or arc contour shape can be specified by the NC apparatus, the workload is reduced compared with the method 1. Moreover, the NC apparatus in this case can change and reuse the input three-dimensional shapes.

In the case of the method 3, because a three-dimensional shape can be generated simply by inputting the parameters related to the template in the NC apparatus, the workload can be reduced compared with the method 2. Moreover, the NC apparatus in this case can also change and reuse the input three-dimensional shapes.

Meanwhile, regarding the expression capability of a three-dimensional shape, the method 2 is higher than the method 3 and the method 1 is higher than the method 2. However, regardless of which method is used, because an operator is involved, erroneous inputs can easily occur.

When an interference check simulation is performed, if the workload is low, the reusability of a three-dimensional shape is high, and the expression capability of a three-dimensional shape is high, this results in easy and accurate generation of a three-dimensional shape. Therefore, the method 2 is a useful method.

In the method 2 as described above, an operator faces the screen of the NC apparatus and manually inputs a cross-sectional shape obtained by projecting a tool onto the plane that passes through the rotation center of the tool shape. With this method 2, if the cross-sectional shape becomes complicated for generating a three-dimensional shape that closely resembles the actual tool, the number of times an input is manually made increases and therefore erroneous inputs by the operator may occur.

Thus, a system is used in some cases which generates a shape obtained by extracting a contour shape from an image captured by a camera and rotating the contour shape instead of the operator manually inputting a contour shape of a cross section. With the use of this system, a three-dimensional shape can be generated without involving the operator manually performing inputs. In such a system, for example, a three-dimensional shape is generated on the basis of a two-dimensional image obtained by imaging a rotating body (for example, see Patent Literature 1).

CITATION LIST

Patent Literature

Patent Literature 1: Japanese Patent Application Laid-open 2006-277293

SUMMARY

Technical Problem

In the above-described conventional technology, three-dimensional shape data is generated by extracting a point sequence of a contour shape by using only the contour shape on one side with respect to the rotation center of a captured image. Thus, the three-dimensional shape data becomes uneven as seen in the rotating body obtained from the contour shape on one side. However, the actual rotating tool performs machining by rotating itself; therefore, the rotating tool does not form a recessed shape while rotating. Therefore, when a part enters a recessed portion, interference cannot be detected by an interference check simulation. Consequently, there is a problem in that when three-dimensional shape data is generated by using only the contour shape on one side, a three-dimensional shape appropriate for an interference check simulation cannot be generated.

The present invention is achieved in view of the above and has an object to provide an interference checking device and a numerical control apparatus that easily generate a three-dimensional shape of a tool appropriate for an interference check simulation.

Solution to Problem

In order to solve the above problems and achieve the object, the present invention includes a contour shape analyzing unit that extracts a contour shape of a tool cross section and a tool length by analyzing a two-dimensional image of a rotating tool, a rotation center analyzing unit that obtains a rotation center of the rotating tool by analyzing the contour shape, a rotation shape generating unit that generates a three-dimensional shape of the rotating tool on the basis of the contour shape, the tool length, and the rotation center, and an interference check processing unit that checks whether the rotating tool and a component other than the rotating tool interfere with each other when numerical control machining is performed on a workpiece by using the rotating tool, by using the three-dimensional shape, in which the rotation shape generating unit generates the three-dimensional shape of the rotating tool by using a left-side contour shape, which is a contour shape on a left side of the rotation center in the contour shape, and a right-side contour shape, which is a contour shape on a right side of the rotation center in the contour shape.

Advantageous Effects of Invention

According to this invention, an effect can be obtained where it is possible to easily generate a three-dimensional shape with which interference between a tool used in a machine tool and other components can be checked easily and accurately.

BRIEF DESCRIPTION OF DRAWINGS

FIG. 7-1 is a diagram for explaining a point sequence of a contour shape extracted from a tool image.

FIG. 7-2 is a diagram for explaining a center line set in a tool image.

FIG. 8-1 is a diagram for explaining the three-dimensional-shape calculation process for a tool.

FIG. 8-2 is a diagram for explaining a conventional three-dimensional-shape calculation process.

DESCRIPTION OF EMBODIMENT

An embodiment of an interference checking device and a numerical control apparatus according to the present invention is described below in detail with reference to the drawings. This invention is not limited to this embodiment.

Embodiment

Figure 1:
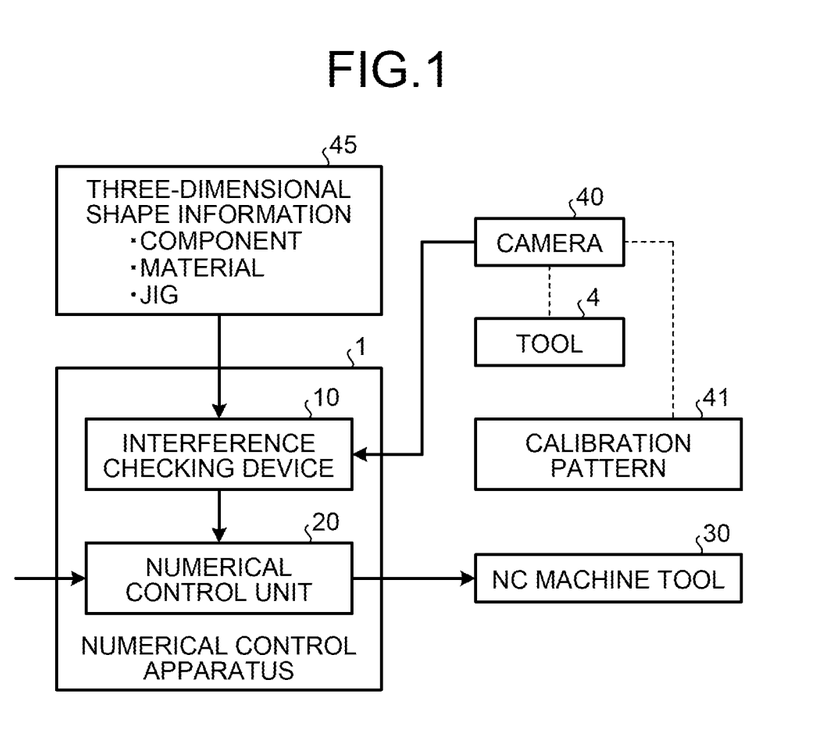
FIG. 1 is a diagram illustrating the configuration of a numerical control apparatus that includes an interference checking device according to an embodiment.

FIG. 1 is a diagram illustrating the configuration of a numerical control apparatus that includes an interference checking device according to the embodiment. A numerical control apparatus 1 is an apparatus that controls an NC machine tool 30 by using an NC program. The numerical control apparatus 1 checks whether interference (collision) occurs in each combination of the components constituting the NC machine tool 30, a tool (rotating tool) 4, a material (not illustrated), and a jig (not illustrated).

The numerical control apparatus 1 simulates (interference check simulation) whether interference occurs by performing an intersection calculation using the three-dimensional shape of each of the components, the tool 4, the material, and the jig. In order to check whether the tool 4 and components other than the tool 4 interfere with each other, the numerical control apparatus 1 in the present embodiment generates a three-dimensional shape of the tool 4 by using the image data of the tool 4.

The numerical control apparatus 1 checks in advance for the possibility of collision. Therefore, when there is a possibility of collision, the numerical control apparatus 1 outputs an appropriate command value (command value to stop or correct a motion trajectory) to, for example, a robot of the NC machine tool 30. Consequently, the numerical control apparatus 1 causes the NC machine tool 30 to perform NC machining while preventing the occurrence of collisions.

The numerical control apparatus 1 includes an interference checking device 10 and a numerical control unit 20. The interference checking device 10 performs an interference check simulation by using an image (calibration pattern image data 51 and tool image data 52, which will be described later) captured by a camera 40, which is an imaging device, and three-dimensional shape information 45 on other components. The numerical control unit 20 controls the NC machine tool 30 by using an interference check result from the interference checking device 10.

The camera 40 images the tool 4 used in the NC machine tool 30 and sends the data of the captured image to the interference checking device 10 as the tool image data 52. Moreover, the camera 40 captures an image of a calibration pattern 41 and sends the data of the captured image to the interference checking device 10 as the calibration pattern image data 51.

The calibration pattern 41 is a pattern that is used when the tool 4 imaged by the camera 40 is converted to the actual length (actual size) and is imaged by the camera 40 in advance. The camera 40 images the calibration pattern 41 in accordance with an instruction from an operator 2 and images the tool 4 specified by the operator 2 as an interference check target. The three-dimensional shape information 45 on other components is information on the three dimensional shapes of the components constituting the NC machine tool 30, the material that is subjected to NC machining, and the jig that is used when NC machining is performed.

Figure 2:
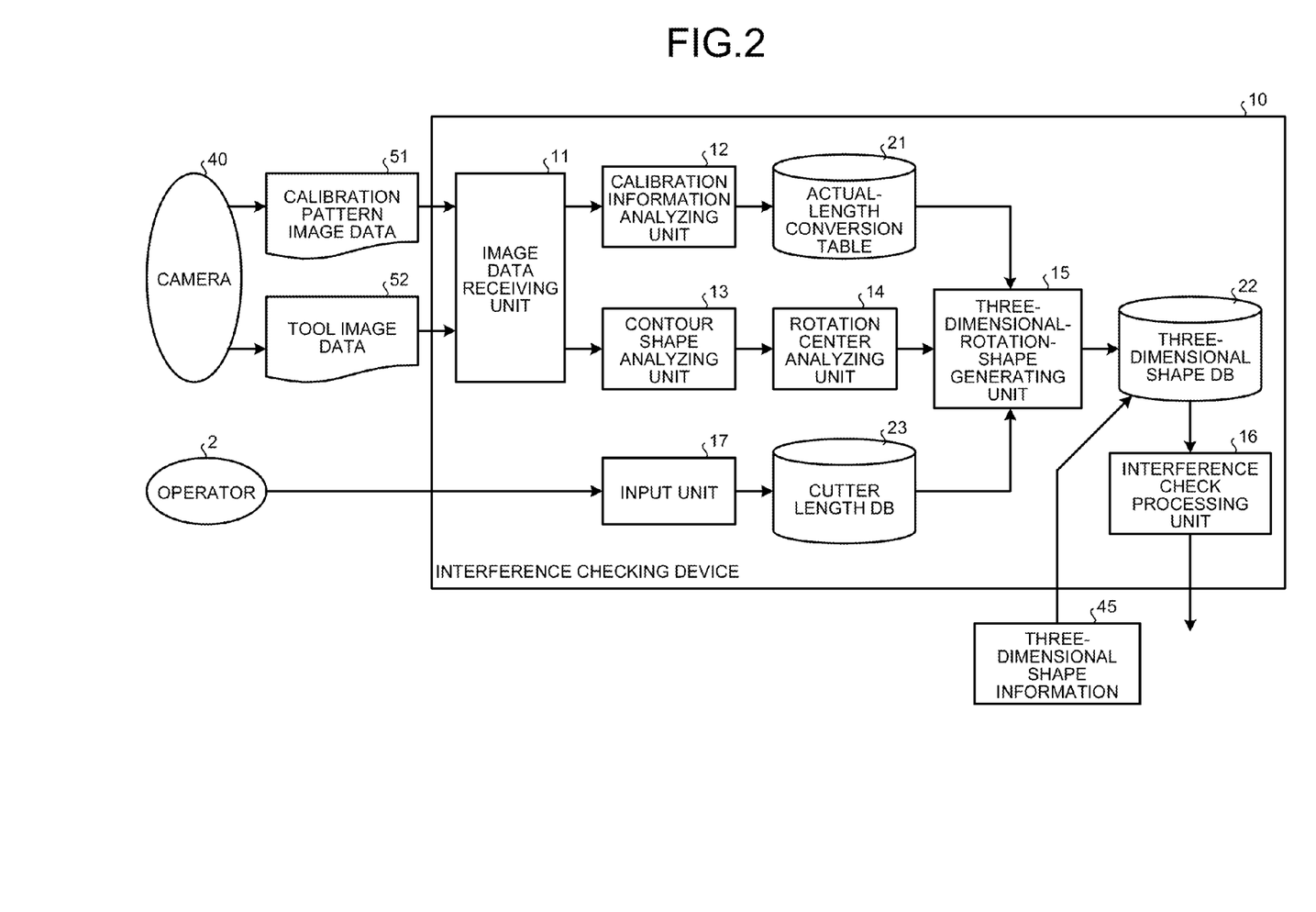
FIG. 2 is a block diagram illustrating the configuration of the interference checking device according to the embodiment.

Next, the configuration of the interference checking device 10 will be described. FIG. 2 is a block diagram illustrating the configuration of the interference checking device according to the embodiment. The interference checking device 10 has a function of calculating the three-dimensional rotation shape of the tool 4 by using the tool image data 52 and of storing the shape in a three-dimensional shape DB 22. Moreover, the interference checking device 10 has a function of calculating the actual length of the tool 4 by using the calibration pattern image data 51 and of storing the actual length in an actual-length conversion table 21. Moreover, the interference checking device 10 has a function of storing information on a cutter in a cutter length DB 23 on the basis of the information input by the operator 2.

Specifically, the interference checking device 10 includes an image data receiving unit 11, a calibration information analyzing unit 12, the actual-length conversion table 21, a contour shape analyzing unit 13, a rotation center analyzing unit 14, a three-dimensional-rotation-shape generating unit 15, the three-dimensional shape DB (database) 22, an interference check processing unit 16, an input unit 17, and the cutter length DB 23.

The image data receiving unit 11 receives the calibration pattern image data 51 sent from the camera 40 and sends it to the calibration information analyzing unit 12. Moreover, the image data receiving unit 11 receives the tool image data 52 sent from the camera 40 and sends it to the contour shape analyzing unit 13.

The calibration information analyzing unit 12 obtains actual-length conversion factors by using the calibration pattern 41 and the calibration pattern image data 51. The actual-length conversion factor is a factor that is used when an image captured by the camera 40 is converted to the actual length. The calibration information analyzing unit 12 obtains actual-length conversion factors such that the calibration pattern image data 51 is arranged at a position that is the same as the points of the calibration pattern 41, which are arranged vertically and horizontally at regular intervals. When an image captured by the camera 40 is converted to the actual length, each pixel in the image is converted to the position obtained by using conversion factors and the actual length is calculated on the basis of the positions after conversion. The calibration information analyzing unit 12 registers actual-length conversion factors in the actual-length conversion table 21.

When an interference check simulation is performed in the numerical control apparatus 1, it is necessary to generate a three-dimensional shape that matches the actual machine component. In the present embodiment, actual-length conversion factors are used as calibration information for converting the captured image of the tool 4 to the actual size.

The actual-length conversion table 21 is a table in which actual-length conversion factors in the vertical direction and horizontal direction are registered. The actual-length conversion table 21 is stored, for example, in a memory connected to the calibration information analyzing unit 12.

The contour shape analyzing unit 13 extracts a point sequence of the contour shape and the tool length that are obtained when the tool 4, which is a rotating tool, is projected onto the plane that passes through the rotation center of the tool 4 by using the tool image data 52, which is two-dimensional data. The point sequence of the contour shape is, for example, a point sequence that is obtained by connecting pixels whose difference in shading from an adjacent pixel exceeds a predetermined threshold in ascending order of distance. In other words, the point sequence of the contour shape is a group of points (point sequence) on the contour shape of the tool 4. The predetermined threshold in this example is set in a parameter used for the contour shape analyzing process. The contour shape analyzing unit 13 sends the extracted point sequence of the contour shape to the rotation center analyzing unit 14.

The rotation center analyzing unit 14 obtains a maximum value and a minimum value of a coordinate (for example, X coordinate) on the basis of the point sequence of the contour shape and the tool length that are extracted. The rotation center analyzing unit 14 determines the center line (a center line C, which will be described later) of the tool 4, with respect to which the contour shape becomes bilaterally symmetrical, on the basis of the maximum value and minimum value of the coordinate. The rotation center analyzing unit 14 sends the set center line C and the point sequence of the contour shape to the three-dimensional-rotation-shape generating unit 15.

The input unit 17 inputs the cutter length of the tool 4 defined by the operator 2 for each type of the tool 4 and stores it in the cutter length DB 23. The cutter length DB 23 is a database in which the cutter length for each type of the tool 4 is stored as cutter length information. The cutter is part of the tool 4, which comes directly into contact with the material and machines the material. The cutter length DB 23 is referred to when the point sequence of the contour shape is divided into a cutter portion and a portion other than the cutter portion.

The three-dimensional-rotation-shape generating unit (rotation shape generating unit) 15 extracts a right-side contour shape, which is surrounded by the right half of the contour shape and the center line C, and a left-side contour shape, which is surrounded by the left half of the contour shape and the center line C, on the basis of the point sequence of the contour shape and the center line C. The right-side contour shape is a portion on the right side of the center line C in the contour shape, and the left-side contour shape is a portion on the left side of the center line C in the contour shape.

The three-dimensional-rotation-shape generating unit 15 generates a new contour shape by superimposing (by performing an OR operation on) the contour shapes on the right and left sides upon each other. Moreover, the three-dimensional-rotation-shape generating unit 15 converts the new contour shape (two-dimensional shape) to the actual length on the basis of the actual-length conversion table 21 and the information on the size of the new contour shape. Moreover, the three-dimensional-rotation-shape generating unit 15 causes the contour shape converted to the actual length to rotate about the center line C, which is the rotation axis, thereby generating the three-dimensional shape of the tool 4.

Furthermore, the three-dimensional-rotation-shape generating unit 15 divides the three-dimensional shape of the tool 4 into a cutter portion and a portion other than the cutter portion on the basis of the cutter length information in the cutter length DB 23. For a rotating body (three-dimensional shape) obtained from the contour shape, the three-dimensional-rotation-shape generating unit 15 sets a portion with the cutter length starting from the tip as a cutter portion and sets the remaining portion as a portion other than the cutter portion.

The three-dimensional-rotation-shape generating unit 15 stores the three-dimensional shape of the cutter portion and the three-dimensional shape of the portion other than the cutter portion in the three-dimensional shape DB 22. The three-dimensional shape DB 22 is a database that stores the three-dimensional shape of the tool 4 and the three-dimensional shape information 45. The three-dimensional shape DB 22 stores the three-dimensional shape of the cutter portion and the three-dimensional shape of the portion other than the cutter portion as the three-dimensional shape of the tool 4.

The interference check processing unit 16 checks whether interference occurs in each combination of the components constituting the NC machine tool 30, the tool 4, the material, and the jig on the basis of the three-dimensional shape of the tool 4, the three-dimensional shape information 45, and the machining program. The interference check processing unit 16 sends the interference check result to the numerical control unit 20.

Figure 3:
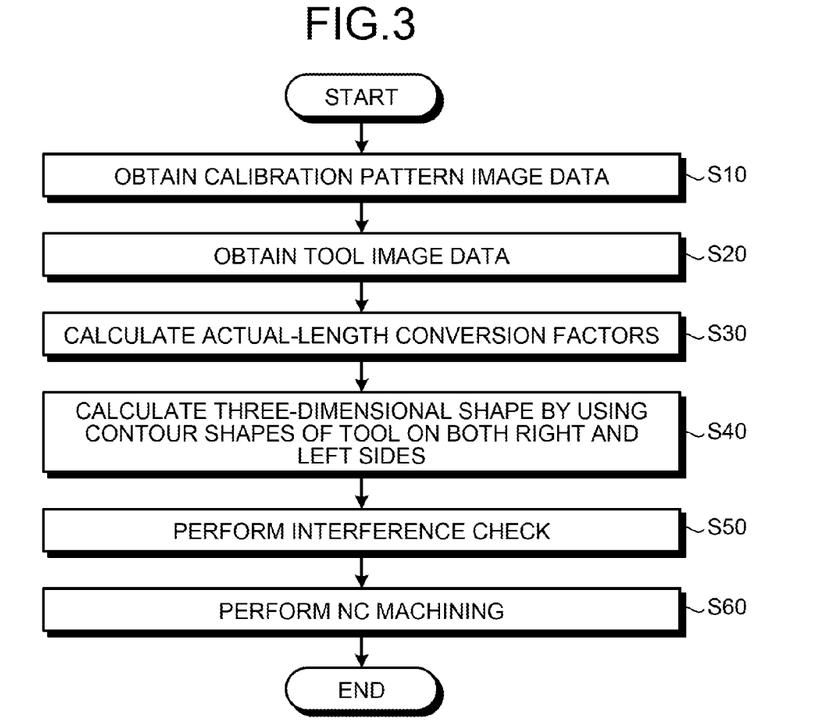
FIG. 3 is a flowchart illustrating the NC machining process procedure performed by the numerical control apparatus.

Next, the NC machining process procedure performed by the numerical control apparatus 1 will be explained. FIG. 3 is a flowchart illustrating the NC machining process procedure performed by the numerical control apparatus. The interference checking device 10 of the numerical control apparatus 1 obtains the calibration pattern image data 51 from the camera 40 (Step S10). Moreover, the interference checking device 10 obtains the tool image data 52 from the camera 40 (Step S20). The numerical control apparatus 1 may obtain the calibration pattern image data 51 and the tool image data 52 in any order.

The interference checking device 10 obtains actual-length conversion factors used when the image is converted to the actual length on the basis of the calibration pattern 41 and the calibration pattern image data 51 (Step S30). Furthermore, the interference checking device 10 calculates the three-dimensional shape of the tool 4 by using information on the contour shapes of the tool 4 on both of the right and left sides (right-side contour shape and left-side contour shape) and the size of the tool 4 (Step S40). Then, the interference checking device 10 performs an interference check on each combination of the components constituting the NC machine tool 30, the tool 4, the material, and the jig by using the three-dimensional shape of the tool 4 (Step S50).

The interference checking device 10 sends the interference check result to the numerical control unit 20. The numerical control unit 20 performs numerical control on the NC machine tool 30 on the basis of the interference check result. Consequently, the NC machine tool 30 performs NC machining by using the tool 4 (Step S60).

Figure 4:
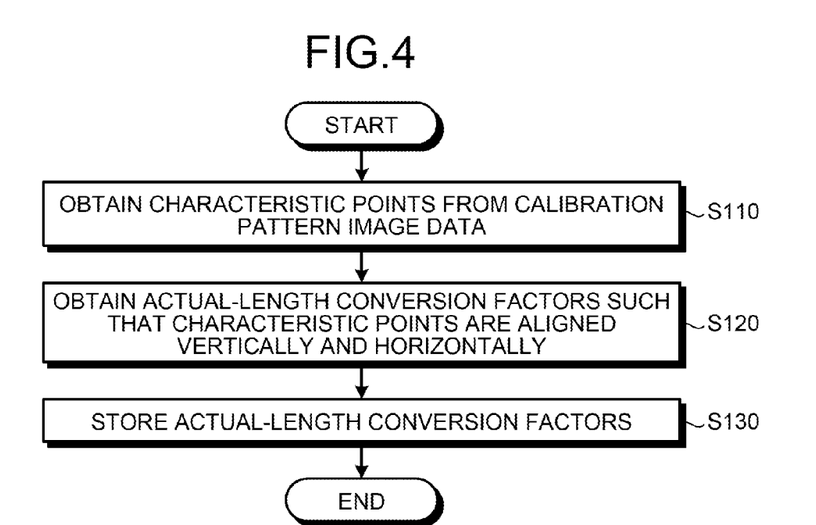
FIG. 4 is a flowchart illustrating the calculation process procedure of calculating actual-length conversion factors.
Figure 5:
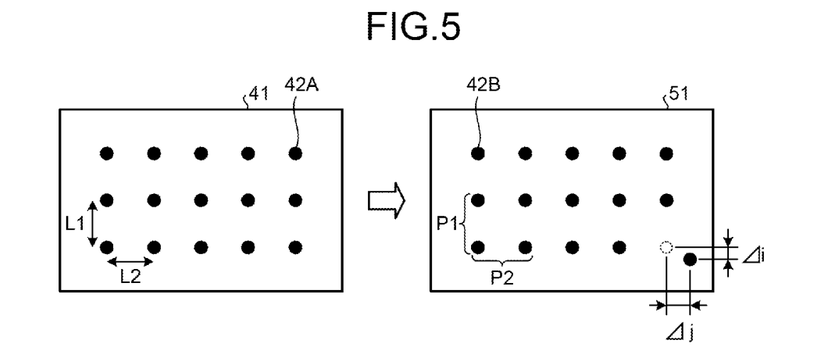
FIG. 5 is a diagram illustrating the relationship between a calibration pattern and calibration pattern image data.

Next, an explanation will be made of the calculation process procedure of actual-length conversion factors used when an image is converted to the actual length. FIG. 4 is a flowchart illustrating the calculation process procedure of calculating actual-length conversion factors. FIG. 5 is a diagram illustrating the relationship between the calibration pattern and the calibration pattern image data.

The calibration pattern 41 is a printed pattern in which characteristic points 42A in M rows and N columns are printed at predetermined intervals in vertical and horizontal directions (vertical interval is an interval L1 and horizontal interval is an interval L2). In this example, M and N are natural numbers, and L1 and L2 are, for example, 10 mm.

When the calibration pattern 41 is placed in a predetermined imaging environment and the camera 40 images the calibration pattern 41, the camera 40 can obtain data of the imaged pattern in which characteristic points are aligned at intervals of P1 pixel×P2 pixel as the calibration pattern image data 51. The calibration pattern image data 51 is obtained by imaging the characteristic points 42A and is image data of characteristic points 42B corresponding to the characteristic points 42A.

In this imaging environment, if the characteristic points 42B are not displaced, the calibration pattern image data 51 has an actual-length conversion factor of L1/P1 mm per pixel in the vertical direction and has an actual-length conversion factor of L2/P2 mm per pixel in the horizontal direction.

Therefore, if the characteristic point 42B at the position of row m (m is a natural number from 1 to M)×column n (n is a natural number from 1 to N) is displaced by Δim pixel in the vertical direction and is displaced by Δjn pixel in the horizontal direction, the characteristic point 42B at the position of row m×column n has an actual-length conversion factor of L1/(P1+Δim) mm in the vertical direction and has an actual-length conversion factor of L2/(P2+Δjn) mm in the horizontal direction.

For example, if the characteristic point 42B at the position of row M×column N is displaced by Δi pixel in the vertical direction and is displaced by Δj pixel in the horizontal direction, the characteristic point 42B at the position of row M×column N has an actual-length conversion factor of L1/(P1+Δi) mm in the vertical direction and has an actual-length conversion factor of L2/(P2+Δj) mm in the horizontal direction.

The calibration information analyzing unit 12 calculates such actual-length conversion factors for each characteristic point 42B on the basis of the calibration pattern 41 and the calibration pattern image data 51. Specifically, the calibration information analyzing unit 12 obtains the positions of the characteristic points 42B from the calibration pattern image data 51 (Step S110). The calibration information analyzing unit 12 obtains actual-length conversion factors for each characteristic point 42B such that the characteristic points 42B are aligned vertically and horizontally at intervals that are the same as those of the calibration pattern 41 (the characteristic points 42A) (Step S120). The calibration information analyzing unit 12 stores the obtained M×N actual-length conversion factors in the actual-length conversion table 21 (Step S130). The actual-length conversion factors are referred to when the three-dimensional-rotation-shape generating unit 15 converts the tool image (point sequence of the contour shape) to the actual length matching the size of the NC machine tool 30.

If Δi or Δj is negligibly small, actual-length conversion factors may be uniformly set to L1/P1 mm in the vertical direction and uniformly set to L2/P2 mm in the horizontal direction. In this case, for example, L1/P1 mm, which is an actual-length conversion factor in the vertical direction, and L2/P2 mm, which is an actual-length conversion factor in the horizontal direction, are manually input by the operator 2 and are stored in the actual-length conversion table 21. In this case, the calibration information analyzing unit 12 is not necessary.

Figure 6:
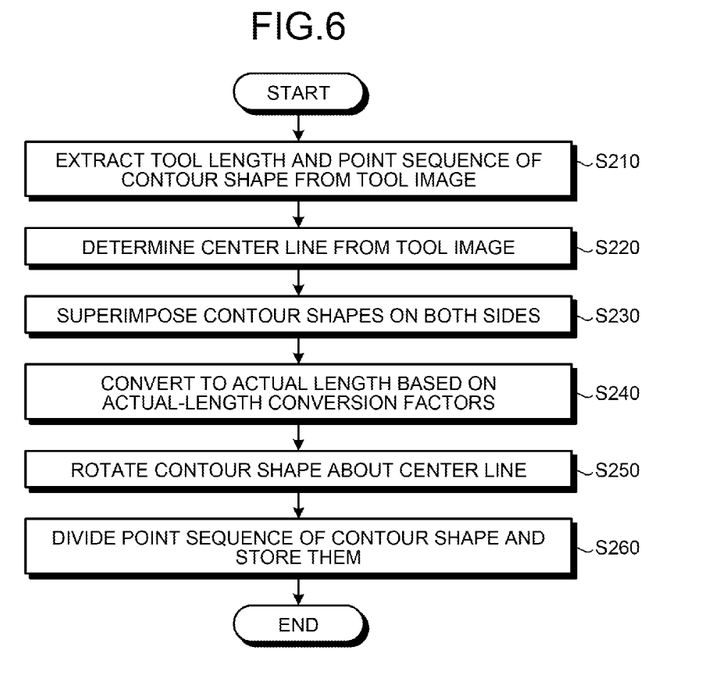
FIG. 6 is a flowchart illustrating the three-dimensional-shape calculation process procedure for a tool.

Next, an explanation will be made of the three-dimensional-shape calculation process procedure for the tool 4. FIG. 6 is a flowchart illustrating the three-dimensional-shape calculation process procedure for the tool. By using the tool image (two-dimensional image) of the tool image data 52, the contour shape analyzing unit 13 extracts the tool length and the point sequence of the contour shape that are obtained when the tool 4 is projected onto the plane that passes through the center of the rotating tool (the tool 4) (Step S210). The contour shape analyzing unit 13 may generate in advance the contour shape by using the point sequence of the contour shape.

Figure 71:
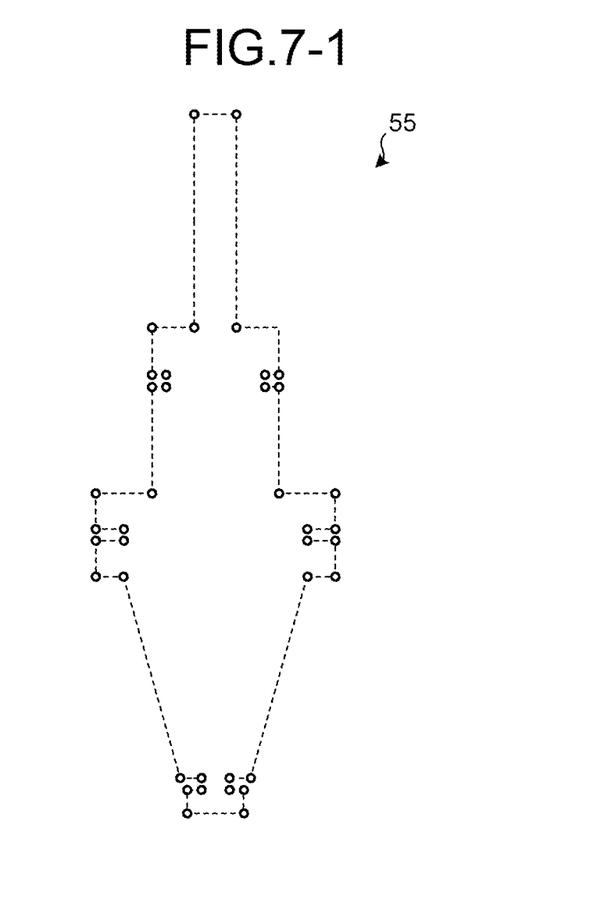
Figure 72:
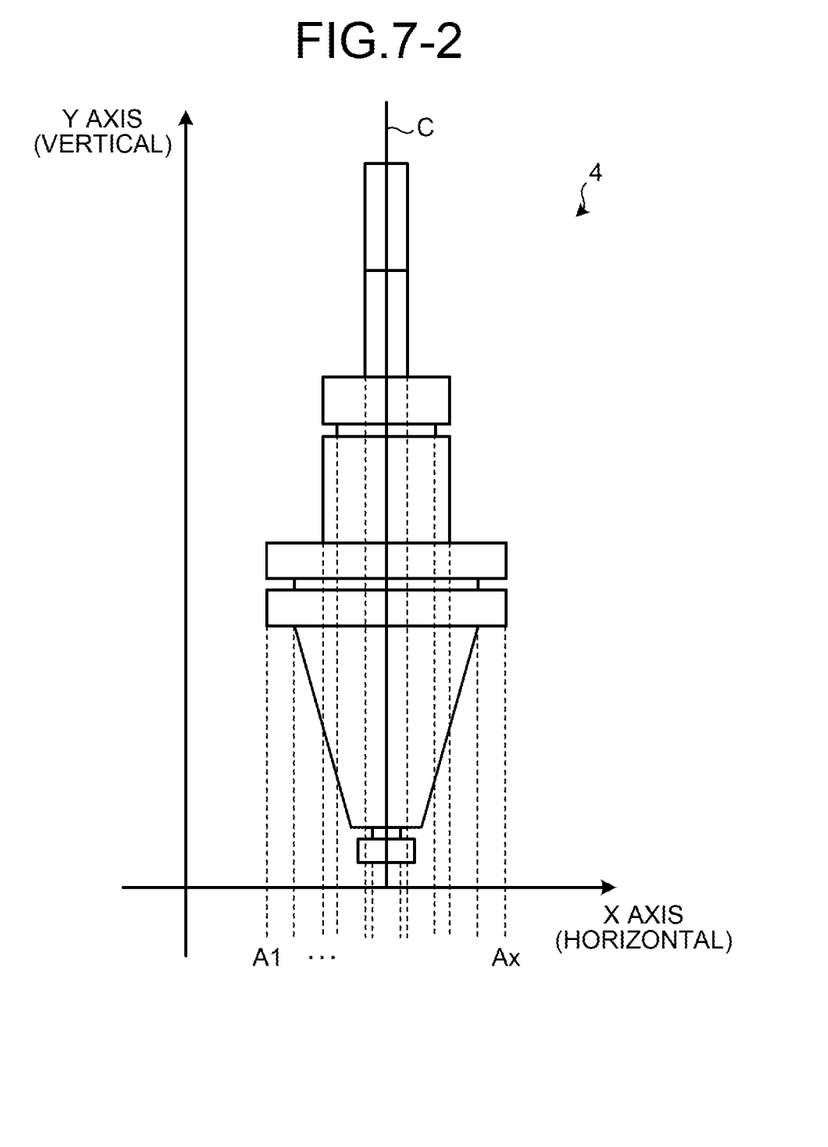

Furthermore, the contour shape analyzing unit 13 obtains the center line C of the tool image on the basis of the point sequence of the contour shape. FIG. 7-1 is a diagram for explaining the point sequence of the contour shape extracted from the tool image. FIG. 7-2 is a diagram for explaining the center line set in the tool image. FIG. 7-2 illustrates an image (tool image) of the tool 4 instead of the point sequence of the contour shape; however, the point sequence of the contour shape may be used for obtaining the center line C of the tool image.

As illustrated in FIG. 7-1, a point sequence 55 of the contour shape is a group of points arranged on the contour shape when the tool 4 is projected onto the plane that passes through the center of the tool 4. The point sequence 55 is arranged at corner parts of the contour shape of the tool 4.

As illustrated in FIG. 7-2, the rotation center analyzing unit 14 arranges the tool image with reference to the lower left of the tool image in the coordinate system in which the horizontal direction of the point sequence of the contour shape (tool image) is the X axis and the vertical direction of the point sequence of the contour shape is the Y axis. In other words, the rotation center analyzing unit 14 arranges the tool image such that the lower left of the whole image becomes the origin.

The rotation center analyzing unit 14 focuses on the X value of the contour shape of the tool image and obtains a minimum value A1 and a maximum value Ax (x is a natural number) of the X value. Then, the rotation center analyzing unit 14 determines y=(A1+Ax)/2, which passes through the midpoint between the minimum value A1 and the maximum value Ax and is a line parallel to the Y axis, as the center line C of the tool 4 (Step S220).

Figure 81:
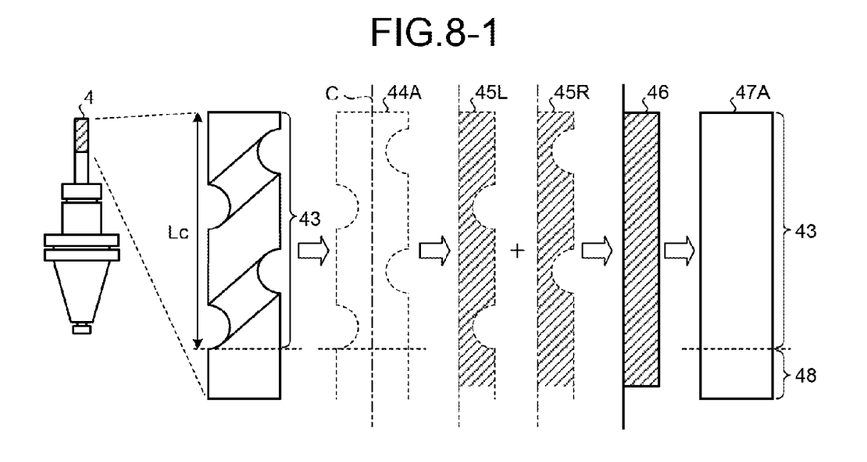

FIG. 8-1 is a diagram for explaining the three-dimensional-shape calculation process for the tool. The contour shape analyzing unit 13 extracts information (a contour-shape point sequence 44A) on the point sequence of the contour shape and the size from the image of the tool 4 that includes a cutter portion 43. The contour-shape point sequence 44A in this example corresponds to the point sequence 55 explained in FIG. 7-1. The rotation center analyzing unit 14 sets the center line C in the contour-shape point sequence 44A.

The three-dimensional-rotation-shape generating unit 15 extracts the point sequence (hereinafter, referred to as a right-side point sequence 45R) of the right-side contour shape, which is surrounded by the right half of the contour shape and the center line C, and the point sequence (hereinafter, referred to as a left-side point sequence 45L) of the left-side contour shape, which is surrounded by the left half of the contour shape and the center line C, on the basis of the contour-shape point sequence 44A and the center line C. The right-side point sequence 45R and the left-side point sequence 45L in this example are extracted by using information on the tool length; therefore, they have information on the size.

Then, the three-dimensional-rotation-shape generating unit 15 turns any one of the right-side point sequence 45R and the left-side point sequence 45L over about the center line C. FIG. 8-1 illustrates a case where the left-side point sequence 45L is turned over about the center line C.

Then, the three-dimensional-rotation-shape generating unit 15 generates a new contour-shape point sequence (contour shapes on both sides) (hereinafter, referred to as a superimposed point sequence 46) by superimposing (by performing an OR operation on) the right-side point sequence 45R and the left-side point sequence 45L that is turned over (Step S230). The superimposed point sequence 46, upon which both the right-side point sequence 45R and the left-side point sequence 45L are superimposed, is obtained by filling in the region surrounded by the right-side point sequence 45R and the region surrounded by the left-side point sequence 45L and by superimposing the both filled-in regions upon each other. Consequently, a new point sequence of the contour shape in which the recessed portions due to the blade of the cutter are removed is generated. In other words, a point sequence (in this example, a point sequence aligned along the rectangular periphery) in which the recess portions (grooves) of the cutter portion 43 are filled in is generated. The right-side point sequence 45R and the left-side point sequence 45L have information on the size; therefore, the superimposed point sequence 46 also has information on the size.

The three-dimensional-rotation-shape generating unit 15 converts the two-dimensional image (the superimposed point sequence 46) to the actual length on the basis of the information on the size of the superimposed point sequence 46 and the actual-length conversion factors in the actual-length conversion table 21 (Step S240). The three-dimensional-rotation-shape generating unit 15 generates a three-dimensional shape of the tool 4 by rotating the superimposed point sequence 46 (contour shape) converted to the actual length about the center line C, which is the rotation axis (Step S250). The superimposed point sequence 46 in this example is a point sequence aligned along the rectangular periphery. Therefore, if the superimposed point sequence 46 is rotated about the center line C, which is the rotation axis, a columnar three-dimensional shape (a three-dimensional tool shape 47A) is generated. In this manner, because the superimposed point sequence 46 is generated by superimposing the right-side point sequence 45R and the left-side point sequence 45L that is turned over and rotating it, the three-dimensional tool shape 47A becomes an optimum shape for an interference check simulation.

Furthermore, the three-dimensional-rotation-shape generating unit 15 divides the three-dimensional tool shape 47A into the cutter portion 43 of the tool 4 and a portion other than the cutter portion 43 on the basis of the cutter length information in the cutter length DB 23. For a rotating body (the three-dimensional tool shape 47A) obtained from the contour shape, the three-dimensional-rotation-shape generating unit 15 sets a portion with a cutter length Lc starting from the tip as the cutter portion 43 and sets the remaining portion as a portion (the other component 48) other than the cutter portion 43.

When the information (a type of the imaged tool 4) on the three-dimensional-shaped cutter portion 43 to be generated is not stored in the cutter length DB 23, the operator 2 may manually input whether it is the cutter portion 43 or the other component 48 on each occasion.

The three-dimensional-rotation-shape generating unit 15 stores the three-dimensional shape of the cutter portion 43 and the three-dimensional shape of the other component 48 in the three-dimensional shape DB 22. Consequently, the point sequence (three-dimensional tool model) of the contour shape of the tool 4 is stored in the three-dimensional shape DB 22 after being divided into the cutter portion 43 and a portion other than the cutter portion 43 (Step S260). The three-dimensional tool model stored in the three-dimensional shape DB 22 is used when the interference check processing unit 16 performs an interference check simulation. Because the three-dimensional tool model is divided into the cutter portion 43 and a portion other than the cutter portion 43, a portion of the tool 4 to be used when an interference check simulation is performed can be selected depending on the type of machining.

Figure 82:
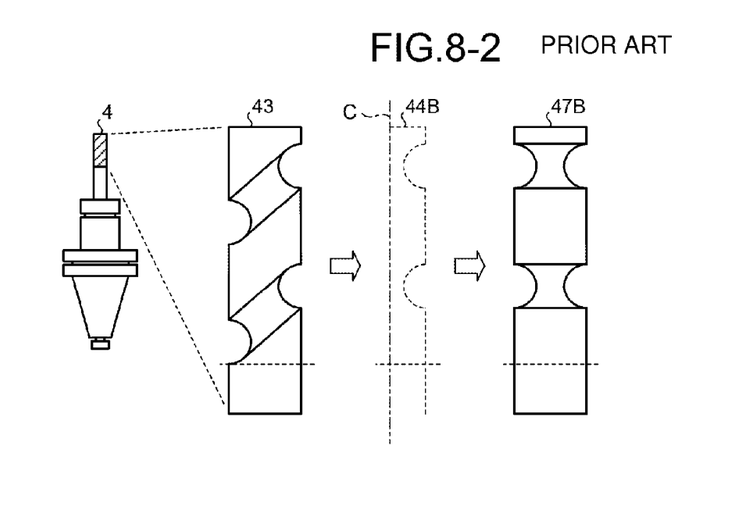

FIG. 8-2 is a diagram for explaining a conventional three-dimensional-shape calculation process. In this example, an explanation will be made of the three-dimensional-shape calculation process for the tool 4. In the conventional three-dimensional-shape calculation process, a contour-shape point sequence 44B, which is surrounded by the right half of the contour shape and the center line C, and the center line C are extracted from the tool image that includes the cutter portion 43. Then, a three-dimensional shape (a three-dimensional tool shape 47B) of the tool 4 is generated by rotating the contour-shape point sequence 44B about the center line C, which is the rotation axis.

With this conventional method, because there are grooves (recessed portions) in the cutter portion 43, the three-dimensional tool shape 47B is not appropriate for performing an interference check simulation using the rotating tool. This is because when a different component enters a groove in the cutter portion 43, it cannot be determined that interference has occurred.

The point sequence of the contour shape and the tool length that are extracted by the contour shape analyzing unit 13 may be corrected or divided into the cutter portion 43 and a portion (the other component 48) other than the cutter portion 43 by the contour shape analyzing unit 13 on the basis of an interrupt instruction that is manually input by the operator 2. In this case, the three-dimensional-rotation-shape generating unit 15 generates a three-dimensional shape by using the point sequence of the contour shape and the tool length that are corrected or divided by the contour shape analyzing unit 13.

Moreover, processes that are performed by the units other than the interference check processing unit 16 in the interference checking device 10 may be performed by a PC (Personal Computer) in a design room arranged at a position different from the numerical control apparatus 1. In other words, the process of generating a three-dimensional shape of the tool 4 and the like may be performed by a PC in a design room. In this case, the camera 40 is connected to the PC and the calibration pattern image data 51 and the tool image data 52, which are imaged by the camera 40, are input to the PC.

The PC generates a three-dimensional shape of the tool 4 by performing a process in a similar manner to the interference checking device 10. The three-dimensional shape of the tool 4 is stored in the three-dimensional shape DB 22 in the PC. The three-dimensional shape in the three-dimensional shape DB 22 is sent to the interference check processing unit 16 that is arranged in a workshop or the like. Consequently, the interference check processing unit 16 performs an interference check. Furthermore, numerical control is performed on the NC machine tool 30 by the numerical control unit 20 arranged in a workshop or the like.

Moreover, the operator 2 may generate the actual-length conversion table 21 by manually inputting it. For example, when the actual-length conversion table (the actual-length conversion factors) is registered such that the imaging environment in which the length per pixel is 10 mm becomes that in which the length per pixel is 20 mm, the interference checking device 10 can generate a three-dimensional shape of the tool 4 in which the length of the imaged tool 4 is doubled.

Moreover, the operator 2 may specify the rotation center (center line C) obtained by the rotation center analyzing unit 14 by manually inputting it. In this case, the interference checking device 10 can set a line that passes through two points specified by the operator 2 as the center line C.

Moreover, the calibration pattern image data 51 and the tool image data 52 that are imaged by the camera 40 connected to the numerical control apparatus 1 may be supplied to the numerical control apparatus 1 that is not connected to the camera 40. In this case also, the calibration pattern image data 51 and the tool image data 52 are input from the image data receiving unit 11.

Moreover, the center line C extracted by the rotation center analyzing unit 14 may be switched from the vertical direction to the horizontal direction by the NC machine tool 30. In this case, the NC machine tool 30 switches the center line C between the vertical direction and the horizontal direction, for example, by using a parameter.

As described above, according to the present embodiment, a three-dimensional shape of the tool 4 is generated by using the right-side point sequence 45R and the left-side point sequence 45L of the tool image; therefore, a three-dimensional tool shape appropriate for an interference check simulation can be easily generated. Thus, it is possible to easily and accurately check interference between the tool 4 used in the NC machine tool 30 and other components. Moreover, the operator 2 does not need to input a three-dimensional shape of the tool 4; therefore, it is possible to eliminate failures caused by humans during an interference check simulation.

Moreover, because the point sequence of the contour shape of the tool 4 is extracted from the tool image data 52, information on the shape of the tool 4 can be extracted more easily than extracting the contour shape itself. Moreover, because actual-length conversion factors are calculated by using the calibration pattern, accurate conversion factors can be calculated.

INDUSTRIAL APPLICABILITY

As described above, the interference checking device and the numerical control apparatus according to the present invention are suitable for interference check between a tool used in a machine tool and other components.

REFERENCE SIGNS LIST 1 numerical control apparatus, 4 tool, 10 interference checking device, 11 image data receiving unit, 12 calibration information analyzing unit, 13 contour shape analyzing unit, 14 rotation center analyzing unit, 15 three-dimensional-rotation-shape generating unit, 16 interference check processing unit, 17 input unit, 20 numerical control unit, 21 actual-length conversion table, 22 three-dimensional shape DB, 30 NC machine tool, 40 camera, 41 calibration pattern, 42A, 42B characteristic point, 43 cutter portion, 44A, 44B contour-shape point sequence, 45 three-dimensional shape information, 45L left-side point sequence, 45R right-side point sequence, 46 superimposed point sequence, 47A, 47B three-dimensional tool shape, 51 calibration pattern image data, 52 tool image data, C center line

The invention claimed is:

1. An interference checking device comprising:
a contour shape analyzer that extracts a contour shape of a tool cross section and a tool length by analyzing a two-dimensional image of a rotating tool;
a rotation center analyzer that obtains a rotation center of the rotating tool by analyzing the contour shape;
a rotation shape generator that generates a three-dimensional shape of the rotating tool on a basis of the contour shape, the tool length, and the rotation center; and
an interference checker that checks whether the rotating tool and a component other than the rotating tool interfere with each other when numerical control machining is performed on a workpiece by using the rotating tool, by using the three-dimensional shape, wherein
the rotation shape generator generates the three-dimensional shape of the rotating tool by using a left-side contour shape, which is a contour shape on a left side of the rotation center in the contour shape, and a right-side contour shape, which is a contour shape on a right side of the rotation center in the contour shape.

2. The interference checking device according to claim 1, wherein the rotation shape generator generates a columnar three-dimensional shape by rotating a contour shape that is obtained by superimposing the left-side contour shape and the right-side contour shape upon each other about the rotation center.

3. The interference checking device according to claim 1, further comprising a calibration information analyzer that calculates a conversion factor, with which the two-dimensional image of the rotating tool is converted to an actual length, by comparing a calibration pattern, which is to be a reference when the two-dimensional image of the rotating tool is converted to an actual length, with a two-dimensional image of the calibration pattern, wherein
the rotation shape generator generates the three-dimensional shape of the rotating tool by using the conversion factor.

4. The interference checking device according to claim 1, wherein
the rotation shape generator divides the three-dimensional shape into a three-dimensional shape of a cutter portion and a three-dimensional shape other than the cutter portion on a basis of a length of the cutter portion of the rotating tool, and the interference checker checks whether the rotating tool and a component other than the rotating tool interfere with each other by using the three-dimensional shape of the cutter portion and the three-dimensional shape other than the cutter portion.

5. The interference checking device according to claim 1, wherein the contour shape analyzer extracts a point sequence on the contour shape as the contour shape of the tool cross section.

6. A numerical control apparatus comprising:

an interference checking device that checks whether a rotating tool and a component other than the rotating tool interfere with each other when numerical control machining is performed on a workpiece by using the rotating tool; and a numerical controller that performs numerical control on the workpiece by using a check result, wherein the interference checking device includes a contour shape analyzer that extracts a contour shape of a tool cross section and a tool length by analyzing a two-dimensional image of the rotating tool, a rotation center analyzer that obtains a rotation center of the rotating tool by analyzing the contour shape, a rotation shape generator that generates a three-dimensional shape of the rotating tool on a basis of the contour shape, the tool length, and the rotation center, and an interference checker that checks whether the rotating tool and a component other than the rotating tool interfere with each other when numerical control machining is performed on a workpiece by using the rotating tool, by using the three-dimensional shape, and the rotation shape generator generates the three-dimensional shape of the rotating tool by using a left-side contour shape, which is a contour shape on a left side of the rotation center in the contour shape, and a right-side contour shape, which is a contour shape on a right side of the rotation center in the contour shape.

* * * * *

UNITED STATES PATENT AND TRADEMARK OFFICE
CERTIFICATE OF CORRECTION

| | |
|---|---|
| PATENT NO. | : 9,122,267 B2 |
| APPLICATION NO. | : 14/000272 |
| DATED | : September 1, 2015 |
| INVENTOR(S) | : Toshiyuki Morita, Nobuyuki Takahashi and Tadahiro Otsuka |

Page 1 of 1

It is certified that error appears in the above-identified patent and that said Letters Patent is hereby corrected as shown below:

On the Title Page, item (71) should read (71) Applicant: Toshiyuki Morita, Nagoya-shi, JAPAN
Nobuyuki Takahashi, Chiyoda-ku, JAPAN
Tadahiro Otsuka, Nagoya-shi, JAPAN Signed and Sealed this
Ninth Day of February, 2016

Michelle K. Lee
*Director of the United States Patent and Trademark Office*